United States Patent
Bapat et al.

(10) Patent No.: US 9,373,321 B2
(45) Date of Patent: Jun. 21, 2016

(54) GENERATION OF WAKE-UP WORDS

(71) Applicant: Cypress Semiconductor Corporation, San Jose, CA (US)

(72) Inventors: Ojas Ashok Bapat, Sunnyvale, CA (US); Kenichi Kumatani, Sunnyvale, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 30 days.

(21) Appl. No.: 14/093,703

(22) Filed: Dec. 2, 2013

(65) Prior Publication Data
US 2015/0154953 A1 Jun. 4, 2015

(51) Int. Cl.
| G10L 15/00 | (2013.01) |
|---|---|
| G10L 15/26 | (2006.01) |
| G10L 17/00 | (2013.01) |
| G10L 15/18 | (2013.01) |
| G10L 21/00 | (2013.01) |
| G10L 25/00 | (2013.01) |
| G10L 15/06 | (2013.01) |
| G10L 15/08 | (2006.01) |

(52) U.S. Cl.
CPC .......... *G10L 15/06* (2013.01); *G10L 2015/0638* (2013.01); *G10L 2015/088* (2013.01)

(58) Field of Classification Search
CPC .......... G10L 15/02; G10L 15/08; G10L 15/22
USPC .......................................... 704/231–257, 275
See application file for complete search history.

(56) References Cited

U.S. PATENT DOCUMENTS

| 7,720,683 | B1 | 5/2010 | Vermeulen et al. | |
|---|---|---|---|---|
| 2003/0233232 | A1* | 12/2003 | Fosler-Lussier | G10L 15/1815 704/251 |
| 2008/0133245 | A1* | 6/2008 | Proulx | G06F 17/2818 704/277 |
| 2008/0307235 | A1* | 12/2008 | Keohane | G06F 21/46 713/183 |
| 2009/0055162 | A1* | 2/2009 | Qian et al. | 704/8 |
| 2009/0299745 | A1* | 12/2009 | Kennewick | G10L 15/32 704/257 |
| 2013/0262117 | A1* | 10/2013 | Heckmann | G10L 15/1807 704/255 |
| 2013/0289994 | A1* | 10/2013 | Newman et al. | 704/254 |
| 2013/0339028 | A1* | 12/2013 | Rosner | G10L 15/222 704/275 |
| 2014/0012586 | A1* | 1/2014 | Rubin | G10L 25/51 704/273 |
| 2015/0039311 | A1* | 2/2015 | Clark et al. | 704/244 |

OTHER PUBLICATIONS

M. Wölfel and J. McDonough, "Search: Finding the Best Word Hypothesis", Distant Speech Recognition, John Wiley & Sons, Ltd., pp. 231-282, 2009.

(Continued)

*Primary Examiner* — Olujimi Adesanya

(57) ABSTRACT

A method, system and tangible computer readable medium for generating one or more wake-up words are provided. For example, the method can include receiving a text representation of the one or more wake-up words. A strength of the text representation of the one or more wake-up words can be determined based on one or more static measures. The method can also include receiving an audio representation of the one or more wake-up words. A strength of the audio representation of the one or more wake-up words can be determined based on one or more dynamic measures. Feedback on the one or more wake-up words is provided (e.g., to an end user) based on the strengths of the text and audio representations.

20 Claims, 6 Drawing Sheets

(56) References Cited

OTHER PUBLICATIONS

G. Saon and J. Chien, "Large-Vocabulary Continuous Speech Recognition Systems", IEEE Signal Processing Magazine, pp. 18-33, 2012.

Virtanen et al., "Techniques for Noise Robustness in Automatic Speech Recognition", John Wiley & Sons, Ltd., pp. 54-84, 2013.

Hazen et al., "Recognition confidence scoring and its use in speech understanding systems", Computer Speech and Language, vol. 16, pp. 49-67, 2002.

* cited by examiner

GENERATION OF WAKE-UP WORDS

BACKGROUND

1. Field

Embodiments included herein generally relate to generating wake-up words used in speech recognition applications. More particularly, embodiments relate to generating wake-up words that satisfy a predetermined strength in speech recognition applications.

2. Background

A Wake-Up-Word (WUW) speech recognizer is a highly efficient and accurate recognizer used in the detection of a single word or phrase—e.g., wake-up words—when uttered in an alerting context of requesting attention. The WUW speech recognizer can reject all other words, phrases, sounds, noises and other acoustic events with virtually 100% accuracy. This includes, for example, the rejection of the same word or phrase when uttered in a non-alerting context.

The alerting context can refer to a context of requesting attention. For example, the phrase "television turn on" is an example of the word "television" used in the alerting context, or context requesting attention. On the other hand, the phrase "my television is old" is an example of the word "television" not being used in the alerting context. To discriminate between alerting and non-alerting contexts, WUW speech recognizers can implement sophisticated natural language processing subsystems. System developers of WUW speech recognizers oftentimes pre-set or define wake-up words to improve recognition and detection accuracy. However, to maintain the accuracy of the WUW speech recognizers, system developers do not allow end users (of electronic device implementing the WUW speech recognizers) to modify or change the wake-up words.

SUMMARY

There is a need for flexibility in modifying or changing wake-up words in speech recognition systems. The new wake-up words should satisfy a predetermined strength set by, for example, a WUW speech recognizer.

An embodiment includes a method for generating one or more wake-up words. The method includes receiving a text representation of the one or more wake-up words. A strength of the text representation of the one or more wake-up words is determined based on one or more static measures. The method also includes receiving an audio representation of the one or more wake-up words. A strength of the audio representation of the one or more wake-up words is determined based on one or more dynamic measures. Feedback on the one or more wake-up words is provided (e.g., to a user) based on the strengths of the text and audio representations.

Another embodiment includes a system for generating one or more wake-up words. The system includes an interface device and a wake-up-word (WUW) processing engine. The interface device is configured to receive a text representation of the one more wake-up words and an audio representation of the one or more wake-up words. The WUW processing engine is configured to determine a strength of the text representation of the one or more wake-up words based on one or more static measures and to determine a strength of the audio representation of the one or more wake-up words based on one or more dynamic measures. The interface device is also configured to provide feedback on the one or more wake-up words based on the strengths of the text and audio representations.

A further embodiment includes a tangible computer readable medium having stored therein one or more sequences of one or more instructions for execution by one or more processors to perform a method for generating one or more wake-up words. The method includes receiving a text representation of the one or more wake-up words. A strength of the text representation of the one or more wake-up words is determined based on one or more static measures. The method also includes receiving an audio representation of the one or more wake-up words. A strength of the audio representation of the one or more wake-up words is determined based on one or more dynamic measures. Feedback on the one or more wake-up words is provided (e.g., to a user) based on the strengths of the text and audio representations.

Further features and advantages of the embodiments disclosed herein, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the embodiments and to enable a person skilled in the relevant art to make and use the invention.

Figure 1:
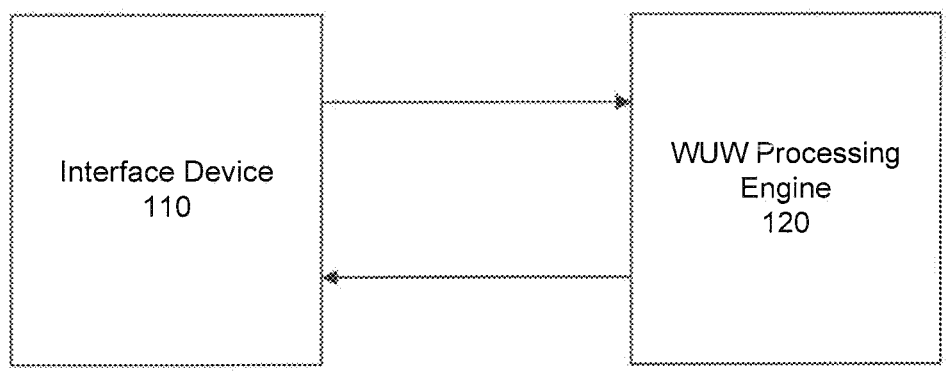
FIG. 1 is an illustration of an embodiment of a system for generating one or more wake-up words.

Embodiments will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

1. Embodiment of a System for Generating One or More Wake-Up Words

FIG. 1 is an illustration of an embodiment of a system 100 for generating one or more wake-up words. System 100 can be integrated into an electronic device that implements, for example, the functions of a wake-up-word (WUW) speech recognizer. In an embodiment, the WUW speech recognizer is a highly efficient and accurate recognizer used in the detection of a single word or phrase (also referred to herein as "wake-up words") when uttered in an alerting context of requesting attention. The WUW speech recognizer can reject all other words, phrases, sounds, noises and other acoustic events with virtually 100% accuracy. This includes, for example, the rejection of the same word or phrase when uttered in a non-alerting context.

For example, system 100 can be integrated into a television, in which system 100 can be used to assess a strength of the one or more wake-up words to control one or more functions of the television—e.g., powering on the television or waking up the television from a sleep mode of operation. The wake-up words can be pre-set or defined by television system developers (e.g., the manufacturer of the television). System 100 allows a television user (e.g., an end user) to modify or change the pre-set or defined wake-up words, while meeting a predetermined strength associated with the wake-up words. In an embodiment, the predetermined strength is based on the WUW speech recognizer achieving high accuracy—e.g., approximate to or at 100% accuracy—when decoding the modified or changed wake-up words.

In referring to FIG. 1, system 100 includes an interface device 110 and a wake-up-word (WUW) processing engine 120. Interface device 110 is configured to provide a user of system 100 an interface to modify or change wake-up words associated with system 100, or an electronic device implementing system 100 (e.g., television). Based on the description herein, a person skilled in the relevant art will recognize that system 100 can be implemented in different types of applications such as, for example and without limitation, vehicles (e.g., automobiles), home appliances (e.g., refrigerators) and the home/office environment (e.g., room lighting).

Figure 2:
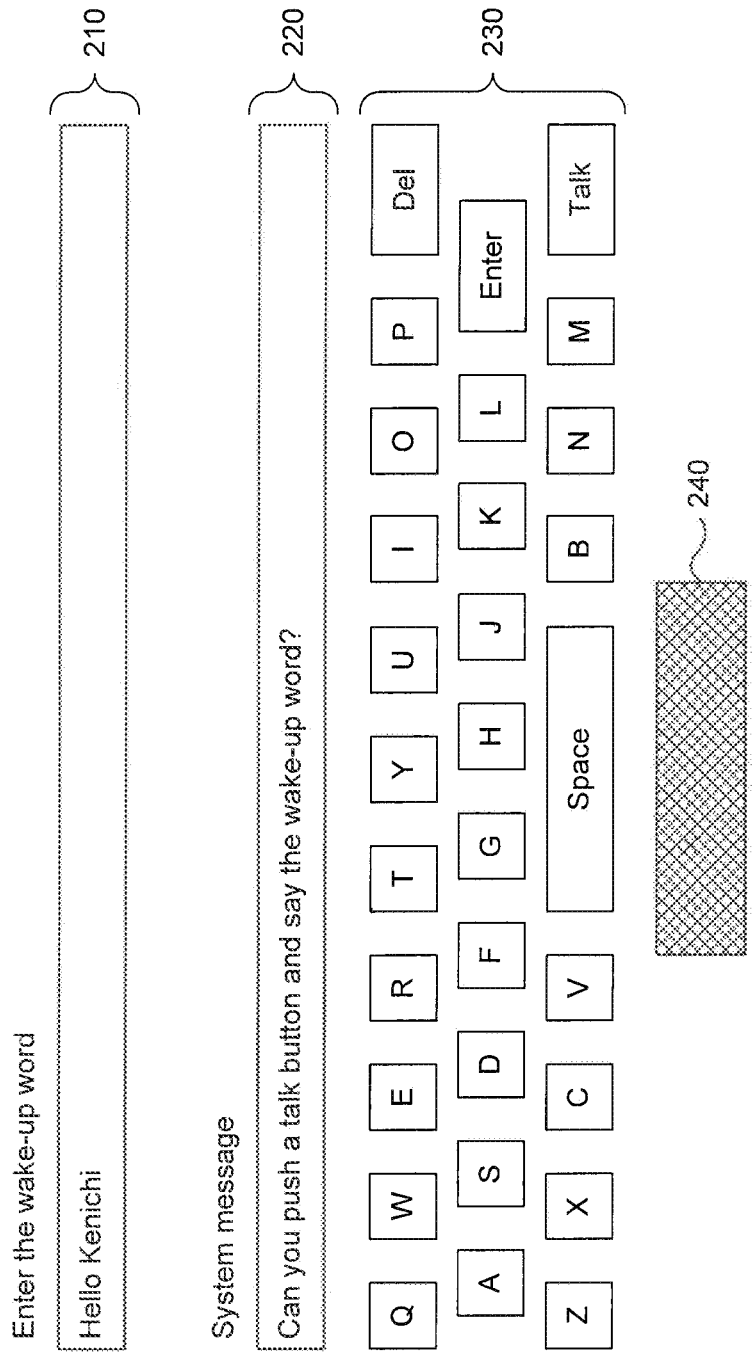
FIG. 2 is an illustration of an embodiment of an interface device from a system for generating one or more wake-up words.

FIG. 2 is an illustration of an embodiment of interface device 110. Interface device 110 includes a user display 210, a system display 220, a keyboard 230 and a microphone 240. User display 210 can be configured to display a text entry of one or more wake-up words from a user (e.g., "Hello Kenichi"), according to an embodiment. System display 220 can be configured to prompt the user for a request (e.g., "Can you push a talk button and say the wake-up word?"), according to an embodiment. The user can enter an alphanumeric text of the one or more wake-up words and push the "Talk" button on keyboard 230. Also, when prompted to utter the one or more wake-up words, microphone 240 can be configured to receive an audio signal representative of the one or more wake-up words from the user.

In referring to FIG. 1, WUW processing engine 120 implements the functions of the WUW speech recognizer. In an embodiment, WUW processing engine 120 receives the text entry of the one or more wake-up words (e.g., "Hello Kenichi") and the speech entry of the one or more wake-up words (e.g., via microphone 240 of FIG. 2). In an embodiment, based on the text and speech entries, WUW processing engine 120 analyzes the one or more wake-up words, assesses the strength of the one or more wake-up words and provides the user with feedback on the one or more wake-up words. For example, if WUW processing engine 120 determines that the one or more wake-up words are "weak" (e.g., the WUW processing engine 120 may not accurately decode the wake-up words), then WUW processing engine 120 can provide feedback to the user (e.g., via system display 220 of FIG. 2). The feedback to the user can be, for example, that the one or more wake-up words should contain five or more syllables or differ in sound from one another. Additional description on the analysis and strength assessment of the one or more wake-up words is provided below.

2. Embodiment of a Method for Generating One or More Wake-Up Words

Figure 3:
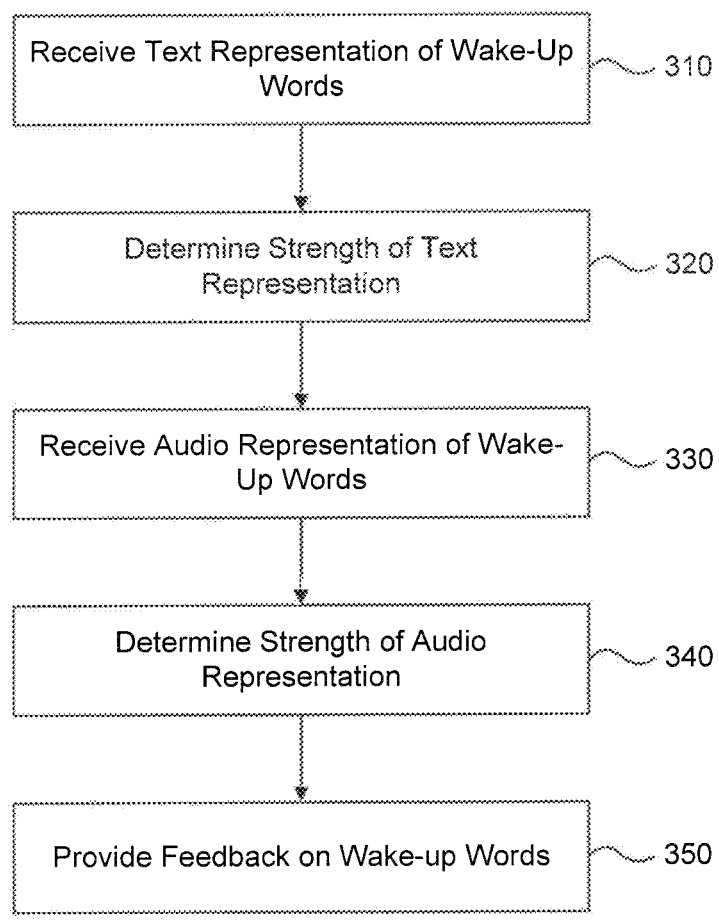
FIG. 3 is an illustration of an embodiment of a method for generating one or more wake-up words.

FIG. 3 is an illustration of a method 300 for generating one or more wake-up words. Method 300 can be performed using, for example, system 100 of FIG. 1. A goal, among others, of method 300 is to allow a user to modify or change one or more wake-up words associated with an electronic device, while meeting a predetermined strength associated a WUW speech recognizer (e.g., integrated into the electronic device).

Method 300 assesses the strength of one or more wake-up words provided by the user based on one or more static measures (e.g., steps 310 and 320) and one or more dynamic measures (e.g., steps 330 and 340). In an embodiment, the one or more static and dynamic measures provide thresholds or criteria in which the one or more wake-up words (e.g., proposed by the user) must meet to be accurately decoded by the WUW speech recognizer. If the one or more wake-up words do not meet the thresholds or criteria, then feedback is provided to the user to further revise his/her selection of the one or more wake-up words (e.g., step 350), according to an embodiment. Additional details on steps 310-250 are provided below.

In step 310, a text representation of the one or more wake-up words is received. In referring to FIG. 2, a user can enter the text representation of the one or more wake-up words (e.g., Hello Kenichi") using keyboard 230.

In step 320, a strength of the text representation of the one or more wake-up words is determined based on one or more static measures. In an embodiment, the term "strength" refers to a likelihood that the one or more wake-up words will be accurately recognized by a WUW speech recognizer (e.g., WUW processing engine 120 of FIG. 1).

In an embodiment, the one or more static measures of step 320 include a number of syllables (e.g., number of phonemes) associated with the one or more wake-up words, a number of phonologically different groups of phonemes associated with the one or more wake-up words, a Kullback-Leibler (KL) divergence calculation between the one or more wake-up words and non-wake-up words or a combination thereof.

In an embodiment, the one or more wake-up words can be required to have a minimum number of syllables—e.g., five or six syllables—such that a WUW speech recognizer (e.g., WUW processing engine 120 of FIG. 1) can accurately decode the one or more wake-up words. For example, the phrase "Hello Kenichi" has five syllables, which can equal or exceed the minimum number of syllables for the WUW speech recognizer to accurately decode the wake-up words.

Also, in an embodiment, the one or more wake-up words can be required have a number of syllables within a predetermined range. For example, the one or more wake-up words can be required to have between five and ten syllables. The lower end of the range (e.g., five syllables) can be based on the minimum number of syllables for the WUW speech recognizer to accurately decode the wake-up words, according to an embodiment. In an embodiment, the upper end of the range (e.g., ten syllables) can be based on the effect of ambient conditions on the decoding of the one or more wake-up words by the WUW speech recognizer. For example, for wake-up words with a higher number of syllables (e.g., more than 10 syllables), ambient conditions such as noise can have a higher probability of adversely affecting the accuracy of the WUW speech recognizer.

In an embodiment, the one or more wake-up words can be required to have a minimum number of phonologically different groups of phonemes. Phonology refers to a systematic organization of sounds in a language (e.g., English, Spanish and French)—e.g., sounds in a language with reference to their distribution and patterning in the pronunciation of words. Examples of phonologically different groups of phonemes include, for example and without limitation, nasal phonemes (e.g., bilabial /m/, alveolar /n/ and velar /N/), stop phonemenes (e.g., consonant sound produced by blocking airflow in the vocal tract) and affricate phonemes (e.g., English sounds spelled "ch" and "j"). The minimum number of phonologically different groups of phonemes can be based on a predetermined number for a WUW speech recognizer (e.g., WUW processing engine 120 of FIG. 1) to accurately decode the one or more wake-up words. For example, a larger number of phonologically different groups of phonemes in the one or more wake-up words can result in a higher decoding accuracy in the WUW speech recognizer.

The KL divergence calculation between the one or more wake-up words and non-wake-up words is another static measure that can be applied in step 320, according to an embodiment. The KL divergence calculation involves a measure of the difference between a first probability distribution associated with each of the phonemes in the one or more wake-up words and a second probability distribution associated with each of the phonemes in non-wake-up words, according to an embodiment. In an embodiment, an acoustic model is generated for each of the one or more wake-up words and non-wake-up words in step 320.

A first acoustic model is generated for phonemes associated with the one or more wake-up words (also referred to herein as a "keyword model"). For example, the keyword model can be represented as Hidden Markov Models (HMMs), which can be trained with speech data based on a maximum likelihood criterion or a discriminative criterion. Such discriminative criterion includes, for example, a minimum classification error, maximum mutual information and a minimum phone error. Exemplary information on HMMs, the maximum likelihood criterion and the minimum discriminative criterion can be found in "Distant Speech Recognition" by Matthias Woelfel and John McDonough (Wiley 2009, ISBN-10:0470517042) and "Large-Vocabulary Continuous Speech Recognition Systems" by George Saon and Jen-Tzung Chien (IEEE Signal Processing Magazine, pp. 18-33, 2011), which are incorporated by reference herein in their entireties.

Since the training speech corpora of the keyword model may not include all possible wake-up words (or a sufficient representation of all possible wake-up words), the keyword model can be built by concatenating phone models or context-dependent models, according to an embodiment. In the case that the training speech corpora includes all possible wake-up words, the keyword model can be built based on the training speech corpora and without concatenation of phone models or context-dependent models, according to an embodiment. A WUW speech recognizer (e.g., WUW processing engine 120 of FIG. 1) can have an acoustic model (e.g., English language model) associated with it, in which the acoustic model can include tens of thousands of senones associated with the phonemes of the acoustic model's language. The phonemes associated with the one or more wake-up words can be parsed from the acoustic model to generate the keyword model.

Figure 4:
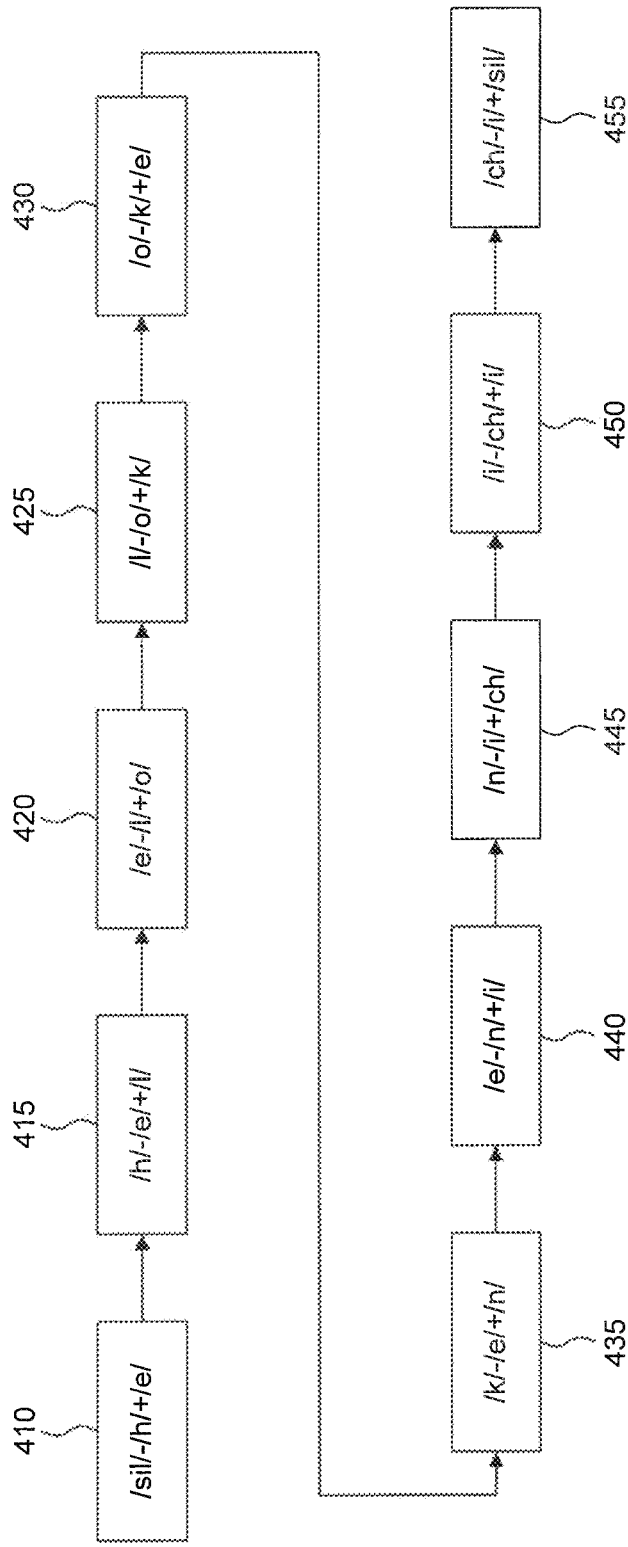
FIG. 4 is an illustration of example phonemes associated with one or more wake-up words.

For example, in referring to FIG. 4, the phonemes associated with each of the sounds in the phrase "Hello Kenichi" can be parsed from the acoustic model to generate the keyword model. In element 410, the phonemes associated with the sounds "/h/" and "/e/" can be allocated to the keyword model. Likewise, in element 415, the phonemes associated with the sounds "/e/" and "/l/" can be allocated to the keyword model. In a similar manner, the phonemes associated with the sounds from elements 420-455 can be allocated to the keyword model. In an embodiment, as referred to herein, the phonemes from the acoustic model that are not allocated to the keyword model are placed in another acoustic model (also referred to herein as a "non-keyword model").

In an embodiment, a KL divergence calculation is performed between each phoneme in the keyword model and each phoneme in the non-keyword model. For each permutation of the KL divergence calculation, the result of the calculation (also referred to herein as a "distance score") is compared to a predetermined distance score. In an embodiment, the predetermined distance score can be based on a predetermined value indicative of a WUW speech recognizer (e.g., WUW processing engine 120 of FIG. 1) accurately decoding the one or more wake-up words. For example, a larger distance score associated with the one or more wake-up words can lead to a higher decoding accuracy in the WUW speech recognizer.

Based on the description herein, a person skilled in the relevant art will recognize that the keyword model can be generated from a plurality of acoustic models (e.g., associated with different languages), in which phonemes associated with the one or more wake-up words are parsed from the plurality of acoustic models and the remaining phonemes are allocated to the non-keyword model. Also, in a similar manner as described above, a KL divergence calculation can be performed between each phoneme in the keyword model and each phoneme in the non-keyword model to calculate distance scores, according to an embodiment.

Again, in step 320, the strength of the text representation of the one or more wake-up words can be determined based on the number of syllables (e.g., number of phonemes) associated with the one or more wake-up words, the number of phonologically different groups of phonemes associated with the one or more wake-up words, the KL divergence calculation between the one or more wake-up words and non-wake-up words or a combination thereof, according to an embodiment. In an embodiment, if the text representation of the one or more wake-up words satisfies the number of syllables criteria (e.g., greater than a minimum number of syllables or within a predetermined range of syllables), the number of phonologically different groups criteria and the KL divergence criteria, then the one or more wake-up words are considered "very strong" and thus meets the criteria for the static analysis.

In an embodiment, the text representation of the one or more wake-up words can meet the criteria for the static analysis even though one of the above criteria is not met. Here, in an embodiment, a weighted average of the results from the static analyses can be used to determine whether the one or more wake-up words meet the static analysis criteria. For example, the number of syllables criteria can have a higher weight than the number of phonologically different groups criteria, which can have a higher weight than the KL divergence criteria. If the KL divergence criteria is not met, but the other two criteria are met, then the one or more wake-up words can be considered "strong" and meet the criteria for the static analysis.

In referring to method 300 of FIG. 3, an audio representation of the one or more wake-up words is received in step 330. In referring to FIG. 2, a user can utter the audio representation of the one or more wake-up words (e.g., "Hello Kenichi") by pushing the "Talk" button on keyboard 230 and uttering the one or more keywords into microphone 240. In an embodiment, an interface device (e.g., interface device 110 of FIG. 1) can prompt the user to provide the audio representation of the one or more wake-up words. For example, in referring to FIG. 2, system display 220 prompts the user to provide the one or more wake-up words—e.g., "Can you push a talk button and say the wake-up word?".

In step 340, a strength of the audio representation of the one or more wake-up words is determined based on one or more dynamic measures. In an embodiment, the term "strength" refers to a likelihood that the one or more wake-up words will be accurately recognized by a WUW speech recognizer (e.g., WUW processing engine 120 of FIG. 1).

In an embodiment, the one or more dynamic measures of step 340 include a voice activity detector (VAD), a confidence score calculation or a combination thereof. In an embodiment, VAD is used to detect the presence or absence of human speech and/or a difference between words in the keyword and non-keyword models. Exemplary information on VADs can be found in "Techniques for Noise Robustness in Automatic Speech Recognition" by Tuomas Virtanen, Rita Singh and Bhiksha Raj (Wiley 2012, ISBN-10:1119970881), which is incorporated by reference herein in its entirety.

In an embodiment, the confidence score calculation refers to a confidence level in which a WUW speech recognizer (e.g., WUW processing engine 120 of FIG. 1) can accurately decode the one or more wake-up words. The confidence score can be, for example, defined as a difference between log-likelihoods of the keyword and non-keyword models or a combination of statistics values of the likelihood of wake-up words in the keyword and non-keyword models. Exemplary information on the statistics values of the likelihoods of wake-up words in the keyword and non-keyword models can be found in "Recognition Confidence Scoring and Its Use in Speech Understanding Systems" by Timothy J. Hazen, Stephanie Seneff and Joseph Polifroni (Computer Speech & Language, 2002, pp. 49-67), which is incorporated by reference herein in its entirety.

Figure 5:
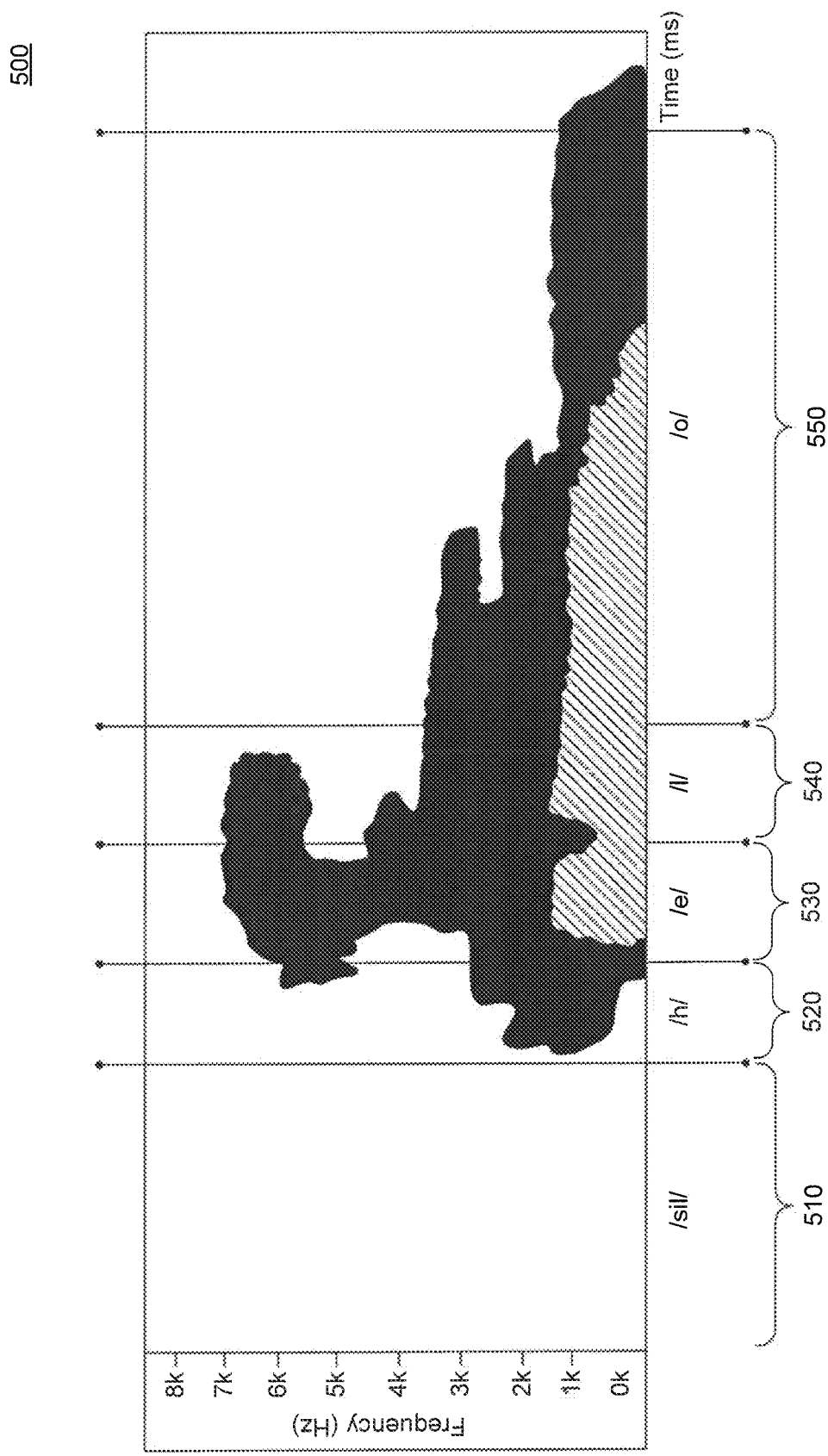
FIG. 5 is an illustration of an example graphical representation of one or more wake-up words.

FIG. 5 is an illustration of a graphical representation 500 of a proposed wake-up word "Hello" (e.g., from the phrase "Hello Kenichi" in FIG. 2). Graphical representation 500 includes a y-axis representing frequency in the units of Hertz (Hz) and an x-axis representing time in the unit of milliseconds (ms). In an embodiment, a WUW speech recognizer can provide a start time and an end time for each sound frame 510-550 of graphical representation 500 using a Viterbi algorithm. An example of the Viterbi algorithm can be found in "Distant Speech Recognition" by Matthias Woelfel and John McDonough (Wiley 2009, ISBN-10:0470517042).

In an embodiment, VAD is also used to analyze each frame of graphical representation 500—e.g., silence frame 510 and sound frames 520-550. For each frame 510-550, VAD is used to determine whether the frame is speech or non-speech, according to an embodiment. By comparing results of the WUW speech recognizer with those of the VAD, an agreement between the two modules can be determined. In an embodiment, if the WUW speech recognizer and VAD consistently provide the same result for each frame 510-550, the proposed wake-up word is considered "strong."

For example, in ideal conditions, VAD can determine that silence frame 510 is associated with silence and that sound frames 520-550 are associated with sound. However, with ambient noise in the speaker's environment, it is oftentimes difficult for VAD to discern between noise/silence and sound with 100% accuracy. This is also the case in the Viterbi alignment of the WUW speech recognizer. As a result, two kinds of modules—WUW speech recognizer and VAD—can provide the same result in ideal conditions. In an embodiment, to account for ambient noise, a percentage of the agreements between the VAD and WUW speech recognizer are compared to a predetermined threshold. This predetermined threshold can be, for example, a false positive predetermined threshold and a false negative predetermined threshold. The false positive and false negative predetermined thresholds can be found based on empirical experiments in different ambient conditions, according to an embodiment.

When generating the VAD results, each of frames 510-550 in FIG. 5 are analyzed one at a time under a plurality of ambient models, according to an embodiment. In an embodiment, the determination for the percentage of agreements between the WUW speech recognizer and VAD for an utterance can be analyzed using the same plurality of ambient models.

The confidence score calculation is another dynamic measure that can be applied in step 340, according to an embodiment. In an embodiment, a confidence score is calculated for each phoneme in the one or more wake-up words, each word in the one or more wake-up words or a combination thereof. To determine the phonemes and each individual word in the one or more wake-up words, the one or more wake-up words can be segmented into phonemes, according to an embodiment. For example, in referring to graphical representation 500 of FIG. 5, the proposed wake-up word "Hello" (e.g., from the phrase "Hello Kenichi" in FIG. 2) is segmented into sound frames 520-550. From these segments (e.g., phonemes), the WUW speech recognizer can determine each individual word in the one or more wake-up words, according to an embodiment.

For each phoneme in the one or more wake-up words (e.g., sound frames 520-550 of FIG. 2), a confidence score is calculated. In an embodiment, a percentage of the phonemes that fall below a predetermined confidence score is compared to a predetermined threshold. Similarly, for each word in the one or more wake-up words, a confidence score is calculated. In an embodiment, a percentage of the words that call below another predetermined confidence score is compared to another predetermined threshold. The phoneme and word predetermined thresholds can be based on a likelihood that the WUW speech recognizer can accurately decode the one or more wake-up words, according to an embodiment.

Again, in step 340, the strength of the audio representation of the one or more wake-up words can be determined based on the VAD, the confidence score calculation or a combination thereof, according to an embodiment. In an embodiment, if the audio representation of the one or more wake-up words satisfies the VAD criteria and the confidence score criteria, then the one or more wake-up words are considered "very strong" and thus meets the criteria for the dynamic analysis.

In an embodiment, the audio representation of the one or more wake-up words can meet the criteria for the dynamic analysis even though one of the above criteria is not met. Here, in an embodiment, a weighted average of the results from the dynamic analysis can be used to determine whether the one or more wake-up words meet the dynamic analysis criteria. For example, VAD criteria can have a higher weight than the confidence score criteria. If the confidence score criteria is not met, but the VAD criteria is met, then the one or more wake-up words can be considered "strong" and meet the criteria for the dynamic analysis.

In referring to method 300 of FIG. 3, in step 350, feedback is provided (e.g., to the user via system display 220 of FIG. 2) on the one or more wake-up words based on the strengths of the text and audio representations (from steps 320 and 340, respectively). If the one or more wake-up words meet the criteria for the static analysis (e.g., step 320) and the dynamic analysis (e.g., step 340), the user is provided feedback that the wake-up words are acceptable, according to an embodiment. In an embodiment, if the one or more wake-up words do not meet the criteria for either the static analysis or the dynamic analysis, then the user is provided feedback that the wake-up words are not acceptable. Such feedback can also include comments to improve the strength of the wake-up words such as, for example and without limitation, the wake-up words require five or more syllables, different sounding words should be used and speak closer to the microphone (e.g., to overcome ambient noise conditions).

3. Example Computer System

Figure 6:
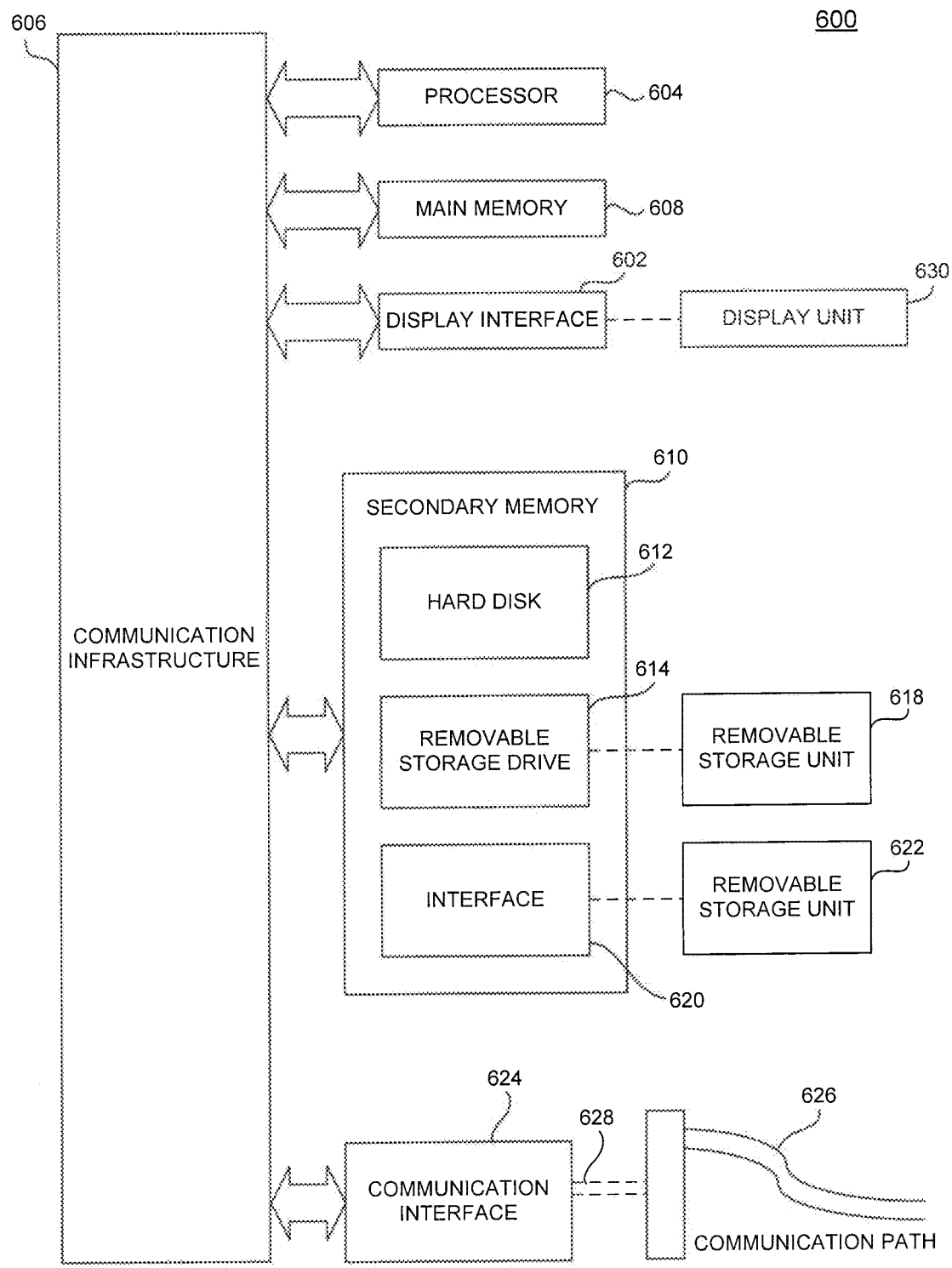
FIG. 6 is an illustration of an example computer system in which embodiments, or portions thereof, can be implemented as computer readable code.

Various aspects of embodiments of the present invention may be implemented in software, firmware, hardware or a combination thereof. FIG. 6 is an illustration of an example computer system 600 in which embodiments of the present invention, or portions thereof, can be implemented as computer-readable code. In an embodiment, the method illustrated by flowchart 300 of FIG. 3 can be implemented in system 600. Various embodiments of the present invention are described in terms of this example computer system 600. After reading this description, it will become apparent to a person skilled in the relevant art how to implement embodiments of the present invention using other computer systems and/or computer architectures.

It should be noted that the simulation, synthesis and/or manufacture of various embodiments of this invention may be accomplished, in part, through the use of computer readable code, including general programming languages (such as C or C++), hardware description languages (HDL) such as, for example, Verilog HDL, VHDL, Altera HDL (AHDL) or other available programming and/or schematic capture tools (such as circuit capture tools). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core that is embodied in program code and can be transformed to hardware as part of the production of integrated circuits.

Computer system 600 includes one or more processors, such as processor 604. Processor 604 may be a special purpose processor, such as WUW processing engine 120 of FIG. 1, or a general-purpose processor. Processor 604 is connected to a communication infrastructure 606 (e.g., a bus or network).

Computer system 600 also includes a main memory 608, preferably random access memory (RAM) and may also include a secondary memory 610. Secondary memory 610 can include, for example, a hard disk drive 612, a removable storage drive 614 and/or a memory stick. Removable storage drive 614 can include a floppy disk drive, a magnetic tape drive, an optical disk drive, a flash memory or the like. The removable storage drive 614 reads from and/or writes to a removable storage unit 618 in a well-known manner. Removable storage unit 618 can comprise a floppy disk, magnetic tape, optical disk, etc. which is read by and written to by removable storage drive 614. As will be appreciated by a person skilled in the relevant art, removable storage unit 618 includes a computer-usable storage medium having stored therein computer software and/or data.

Computer system 600 (optionally) includes a display interface 602 (which can include input and output devices such as keyboards, mice, etc.) that forwards graphics, text and other data from communication infrastructure 606 (or from a frame buffer not shown) for display on display unit 630.

In alternative implementations, secondary memory 610 can include other similar devices for allowing computer programs or other instructions to be loaded into computer system 600. Such devices can include, for example, a removable storage unit 622 and an interface 620. Examples of such devices can include a program cartridge and cartridge interface (such as those found in video game devices), a removable memory chip (e.g., EPROM or PROM) and associated socket and other removable storage units 622 and interfaces 620 which allow software and data to be transferred from the removable storage unit 622 to computer system 600.

Computer system 600 can also include a communications interface 624. Communications interface 624 allows software and data to be transferred between computer system 600 and external devices. Communications interface 624 can include a modem, a network interface (such as an Ethernet card), a communications port, a PCMCIA slot and card or the like. Software and data transferred via communications interface 624 are in the form of signals which may be electronic, electromagnetic, optical or other signals capable of being received by communications interface 624. These signals are provided to communications interface 624 via a communications path 626. Communications path 626 carries signals and can be implemented using wire or cable, fiber optics, a phone line, a cellular phone link, a RF link or other communications channels.

In this document, the terms "computer program medium" and "computer-usable medium" are used to generally refer to tangible media such as removable storage unit 618, removable storage unit 622 and a hard disk installed in hard disk drive 612. Computer program medium and computer-usable medium can also refer to tangible memories, such as main memory 608 and secondary memory 610, which can be memory semiconductors (e.g., DRAMs, etc.). These computer program products provide software to computer system 600.

Computer programs (also called computer control logic) are stored in main memory 608 and/or secondary memory 610. Computer programs may also be received via communications interface 624. Such computer programs, when executed, enable computer system 600 to implement embodiments of the present invention as discussed herein. In particular, the computer programs, when executed, enable processor 604 to implement processes of embodiments of the present invention, such as the steps in the method illustrated by flowchart 300 of FIG. 3 can be implemented in system 600, discussed above. Accordingly, such computer programs represent controllers of the computer system 600. Where embodiments of the present invention are implemented using software, the software can be stored in a computer program product and loaded into computer system 600 using removable storage drive 614, interface 620, hard drive 612 or communications interface 624.

Embodiments are also directed to computer program products including software stored on any computer-usable medium. Such software, when executed in one or more data processing device, causes a data processing device(s) to operate as described herein. Embodiments of the present invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, etc.) and communication mediums (e.g., wired and wireless communications networks, local area networks, wide area networks, intranets, etc.).

4. Conclusion

It is to be appreciated that the Detailed Description section and not the Summary and Abstract sections, is intended to be used to interpret the claims. The Summary and Abstract sections may set forth one or more but not all example embodiments of the present invention as contemplated by the inventors and thus are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the relevant art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by a person skilled in the relevant art in light of the teachings and guidance.

The breadth and scope of the present invention should not be limited by any of the above-described example embodiments, but should be defined only in accordance with the following claims and their equivalents.

What is claimed is:

1. A method for generating one or more wake-up words, the method comprising:
   receiving, using a keyboard, a text representation of the one or more wake-up words;
   determining a strength of the text representation of the one or more wake-up words based on one or more static measures, wherein the determining the strength of the text representation comprises applying a Kullback-Leibler (KL) divergence calculation between the one or more wake-up words and words unrelated to the one or more wake-up words;
   comparing a result of the KL divergence calculation to a predetermined distance score associated with a decoding accuracy of a speech recognizer;
   receiving, using a microphone, an audio representation of the one or more wake-up words;
   determining a strength of the audio representation of the one or more wake-up words based on one or more dynamic measures; and
   providing a message on a display device, wherein the message comprises one or more improvements to a likelihood that the speech recognizer recognizes the one or more wake-up words based on the strengths of the text and audio representations.

2. The method of claim 1, wherein the determining the strength of the text representation of the one or more wake-up words comprises generating a first acoustic model for the text representation of the one or more wake-up words and a second acoustic model for one or more words unrelated to the one or more wake-up words.

3. The method of claim 1, wherein the determining the strength of the text representation of the one or more wake-up words comprises determining a number of syllables in the one or more wake-up words or determining a number of phonologically different groups of phonemes associated with the one or more wake-up words.

4. The method of claim 1, wherein the applying the Kullback-Leibler (KL) divergence calculation comprises calculating a difference between a first probability distribution function associated with one or more phonemes of the one or more wake-up words and a second probability distribution function associated with the words unrelated to the one or more wake-up words.

5. The method of claim 1, wherein the determining the strength of the audio representation of the one or more wake-up words comprises performing a voice activity detection on the audio representation of the one or more wake-up words, calculating one or more confidence scores for the one or more wake-up words or a combination thereof.

6. A system for generating one or more wake-up words, the system comprising:
   an interface device configured to receive a text representation of the one more wake-up words and an audio representation of the one or more wake-up words;
   a wake-up-word (WUW) processing engine configured to determine a strength of the text representation of the one or more wake-up words based on one or more static measures and to determine a strength of the audio representation of the one or more wake-up words based on one or more dynamic measures, wherein to determine the strength of the text representation, the WUW processing engine is configured to apply a Kullback-Leibler (KL) divergence calculation between the one or more wake-up words and words unrelated to the one or more wake-up words and compare a result of the KL divergence calculation to a predetermined distance score associated with a decoding accuracy of a speck recognizer; and
   a display device configured to provide a message on one or more improvements to a likelihood that the speech recognizer recognizes the one or more wake-up words based on the strengths of the text and audio representations.

7. The system of claim 6, wherein the interface device comprises a keyboard and a microphone.

8. The system of claim 6, wherein the WUW processing engine is configured to generate a first acoustic model for the text representation of the one or more wake-up words and a second acoustic model for one or more words unrelated to the one or more wake-up words.

9. The system of claim 6, wherein the WUW processing engine is configured to determine a number of syllables in the one or more wake-up words or determine a number of phonologically different groups of phonemes associated with the one or more wake-up words.

10. The system of claim 6, wherein the WUW processing engine is configured to calculate a difference between a first probability distribution function associated with one or more phonemes of the one or more wake-up words and a second probability distribution function associated with the words unrelated to the one or more wake-up words for the Kullback-Leibler (KL) divergence calculation.

11. The system of claim 6, wherein the WUW processing engine is configured to perform a voice activity detection on the audio representation of the one or more wake-up words, calculate one or more confidence scores for the one or more wake-up words or a combination thereof.

12. A non-transitory computer readable medium having stored therein one or more sequences of one or more instructions for execution by one or more processors to perform a method for generating one or more wake-up words, the method comprising:

receiving, using a keyboard, a text representation of the one or more wake-up words;

determining a strength of the text representation of the one or more wake-up words based on one or more static measures, wherein the determining comprises applying a Kullback-Leibler (KL) divergence calculation between the one or more wake-up words and words unrelated to the one or more wake-up words;

comparing a result to the KL divergence calculation to a predetermined distance score associated with a decoding accuracy of a speech recognizer;

receiving, using a microphone, an audio representation of the one or more wake-up words;

determining a strength of the audio representation of the one or more wake-up words based on one or more dynamic measures; and providing a message on a display device, wherein the message comprises one or more improvements to a likelihood that the speech recognizer recognizes the one or more wake-up words based on the strengths of the text and audio representations.

13. The non-transitory computer readable medium of claim 12, wherein the determining the strength of the text representation of the one or more wake-up words comprises generating a first acoustic model for the text representation of the one or more wake-up words and a second acoustic model for one or more words unrelated to the one or more wake-up words.

14. The non-transitory computer readable medium of claim 12, wherein the determining the strength of the text representation of the one or more wake-up words comprises determining a number of syllables in the one or more wake-up words or determining a number of phonologically different groups of phonemes associated with the one or more wake-up words.

15. The non-transitory computer readable medium of claim 12, wherein the applying the Kullback-Leibler (KL) divergence calculation comprises calculating a difference between a first probability distribution function associated with one or more phonemes of the one or more wake-up words and a second probability distribution function associated with the words unrelated to the one or more wake-up words.

16. The non-transitory computer readable medium of claim 12, wherein the determining the strength of the audio representation of the one or more wake-up words comprises performing a voice activity detection on the audio representation of the one or more wake-up words, calculating one or more confidence scores for the one or more wake-up words or a combination thereof.

17. The method of claim 1, wherein the one or more improvements comprises at least one of a number of syllables in the one or more wake-up words, usage of different sounding words, proximity of a user to the microphone when uttering the audio representation, or a combination thereof.

18. The method of claim 1, further comprising:
accepting the one or more wake-up words when the one or more wake-up words meet a static criteria associated with the text representation and a dynamic criteria associated with the audio representation.

19. The method of claim 1, further comprising:
rejecting the one or more wake-up words when the one or more wake-up words do not meet a static criteria associated with the text representation or a dynamic criteria associated with the audio representation.

20. The method of claim 1, wherein the determining the strength of the text representation comprises:
calculating a weighted average of the one or more static measures based on the one or more wake up words;
comparing the weighted average of the one or more static measures to a static criteria associated with the text representation.

* * * * *